United States Patent Office 2,806,840
Patented Sept. 17, 1957

2,806,840

VINYLOXYALKYLCARBAMATES AND VINYL THIOALKYLCARBAMATES

Benjamin F. Aycock, Elkins Park, and Sidney Melamed, Philadelphia, Pa., assignors to Rohm & Haas Company, Philadelphia, Pa., a corporation of Delaware No Drawing. Application July 15, 1955,
Serial No. 522,398

20 Claims. (Cl. 260—77.5)

This invention deals with vinyl ethers and sulfides of the structure of one of Formulas I and II:

I   $(CH_2=CH-S-\phi-NCOO)_nR°$
            |
            R

II  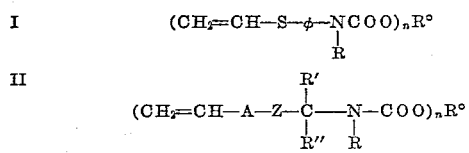

wherein $\phi$ is o-phenylene or p-phenylene, A is oxygen or sulfur, Z is an alkylene group of one to seven carbon atoms, $n$ is an integer having a value of 1 to 2, R is hydrogen, an alkyl group, an alkenyl group, a benzyl group, or a cyclohexyl group, R° is either (a) an ester-forming alcohol residue, including alkyl, alkenyl, benzyl, and cyclohexyl groups when $n$ is 1, or (b) a divalent glycol residue, such as an alkylene group, when $n$ is 2, and R' and R'' each represent a member selected individually from the class consisting of hydrogen and alkyl groups of one to four carbon atoms, R' and R'' not being hydrogen when all of three conditions exist simultaneously, namely that (1) A is oxygen, (2) R is hydrogen, and (3) Z is an alkylene chain of only one to two carbon atoms. This invention is also concerned with a process for preparing these compounds and with polymers and copolymers formed therefrom.

This application is a continuation-in-part of our copending application Serial No. 348,108, filed April 10, 1953, now abandoned.

These compounds are useful as chemical intermediates. When R is hydrogen, they are split upon being heated in the presence of a basic catalyst to form isocyanates which are reactive and useful substances. They can undergo addition reactions at the vinyl linkage. They form interesting polymers when treated with a free radical catalyst. They form interpolymers with other polymerizable vinylidene compounds. These polymers and copolymers have properties which fit them for use as textile finishing agents, in coating compositions, and as adhesives. Monomers having large substituents are useful as resin plasticizers and as stabilizers for polyvinyl chloride.

The compounds of this invention are obtained by the reaction of acetylene on aminoalcohols or aminomercaptans of one of Formulas III and IV:

III         $HS\phi NHR$
IV          

The aminoalcohols or aminomercaptans and acetylene are reacted in the presence of a basic catalyst to produce compounds of Formulas V and VI respectively; thus:

$$CH\equiv CH + HS\phi NHR \longrightarrow CH_2=CHS\phi NHR$$
               III                              V or

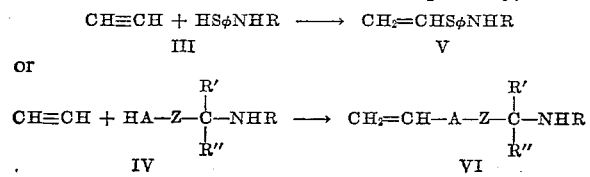

The reaction is readily carried out in the presence of a small amount (5% to 10%) of potassium hydroxide, for example, as catalyst. Acetylene is passed into the alcohol or mercaptan, usually in an inert organic solvent such as benzene, toluene, or high boiling ether, at 120 to 180° C. under pressures of 200 to 500 pounds per square inch. The vinyl ethers or sulfides which are thus formed are separated by distilling under reduced pressure. An alternative procedure for making the sulfides is to react acetylene with an aminoalkylisothiuronium salt of the general Formula VII:

VII  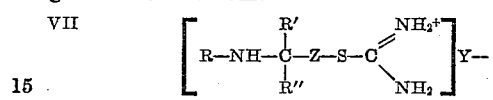

where the symbols are the same as above except Y is a negative anion, such as chloride, bromide, sulfate, and so on. The reaction is carried out under the conditions substantially as just described and more particularly disclosed in application Serial No. 522,397, filed on even date herewith in the hands of a common assignee. The thiuronium salts are made by heating in an alcohol, such as ethanol, at reflux (60 to 80° C.) a mixture of approximately equimolar amounts of thiourea and the corresponding chloride, bromide, or the like having the Formula VIIa:

VIIa   

As typical aminoalcohols there may be used 4-amino-4 - methylpentanol, 4-amino-4-methyl-2-pentanol, 2-amino-2-methylpropanol, 2-amino-2-ethylpropanol, 2-N-methylamino - 2 - methylpropanol, 2 - N - butylamino - 2-methylpropanol, 2-N - 2 - ethylhexylamino - 2 - methylpropanol, 2-N-dodecylamino-2-methylpropanol, 2-N-allylamino-2-methylpropanol, 2-N-benzylamino-2-methylpropanol, 2N-cyclohexylamino-2-methylpropanol, 2-amino-2-methylbutanol, 2-N-methylamino-2-methylbutanol, 2-N-benzylamino-2-methylbutanol, 2-N-cyclohexylamino-2-methylbutanol, 4-aminobutanol, 4-N-methylaminobutanol, 5-aminopentanol, 5-N-methylaminopentanol, 7-amino - 3,7-dimethyloctanol, 2-ethylamino-1-phenylethanol, 2-allylamino-1-hexylethanol. Typical aminomercaptans that may be used include 2-aminoethylmercaptan, 3-aminopropylmercaptan, 2-amino-1-methylethylmercaptan, and 2-aminophenylmercaptan. Typical isothiuronium salts that may be used in the alternative procedure are N-methylaminoethylisothiuronium chloride and 2-aminoisobutylisothiuronium chloride.

The aminoalkyl vinyl ethers or sulfides of Formulas V and VI thus obtained are reacted with an alkyl halocarbonate, sometimes also termed an alkyl haloformate, XCOOR°, where X is chlorine or bromine and R° is an alcohol residue forming an ester. R° may be an aliphatic hydrocarbon group, including such radicals as methyl, ethyl, propyl, butyl, octyl, 2-ethylhexyl, isononyl, dodecyl, cetyl, octadecyl, tetracosyl, allyl, methallyl, undecenyl, and oleyl, or aralkyl such as benzyl and methylbenzyl, or cycloalkyl, such as cyclohexyl, cyclopentyl, and methylcyclohexyl, or a hydrocarbon chain interrupted by oxgen or sulfur, as in ethoxyethyl, butoxyethyl, phenoxyethyl, and the like, or a neutrally substituted group such as p-chlorobenzyl, p-nitrophenyl, chloroethyl, nitroethyl, etc.

The reason why R' and R'' cannot be hydrogen in certain ethers is the need for providing steric hindrance to the nitrogen atom nearby when this nitrogen carries a hydrogen atom in order to prevent cyclization. This steric hindrance is surprisingly unnecessary when sulfides are reacted.

There are several preferred subclasses of alkyl halocarbonates in which R° is an important substituent. For example, R° is desirably an alkyl group of one to four carbon atoms, particularly when the vinyloxyalkylcarbamates or vinyl thioalkylcarbamates are to be converted to isocyanates, in which case R must be hydrogen and R° should be relatively small for economic reasons. On the other hand in some cases where it is desired to separate out the isocyanate derivative, it may be desirable to have R° rather large. Then a carbon content of 12 to 24 carbon atoms becomes advantageous, another preferred class being thus constituted.

The group R° also takes the form of a divalent group which forms diesters. For example, R° may be an ethylene or propylene chain, forming an alkylene bischlorocarbonate. It may also be the residue of a polyglycol, such as ethylene diglycol, propylene diglycol, diethylene triglycol, thiodiglycol, and the like.

The reaction of halocarbonate and aminoalkyl vinyl ether or sulfide is performed in the presence of an acceptor for the hydrogen halide which is split out. Excess aminoalkyl vinyl ether or sulfide can be used for this purpose, an amine hydrohalide being then formed. There may also be used sodium carbonate, sodium bicarbonate, potassium carbonate, sodium hydroxide, or the like, or pyridine, trimethylamine, or other unreactive tertiary amine.

The reaction is carried out at temperatures from 0° to 100° C., desirably in the presence of inert organic solvent such as benzene or toluene. If excess amine is used, amine hydrochloride forms as a precipitate and is filtered off. If an inorganic base is used, the salt formed is conveniently taken up in water and thus separated. The organic solvent is stripped off to leave the product. This may be purified in conventional ways, as by distillation.

Polymerization of monomers is best accomplished with the aid of an azo-type of free radical catalyst. From 0.05% to 2% of one or more of these is generally used with temperatures of polymerization between 50° and 80° C.

The azo catalyst are compounds in which the —N=N— group is attached to aliphatic carbon atoms, at least one of which is tertiary. In these one of the carbon atoms bonded to the tertiary carbon atom has its remaining valences satisfied by at least one element from the class consisting of oxygen and nitrogen. Typical catalysts are azodiisobutyronitrile, azodiisobutyramide, dimethyl, diethyl, or dibutyl azodiisobutyrate, azobis($\alpha,\gamma$-dimethylvaleronitrile), azobis($\alpha$-methylbutyronitrile), azobis($\alpha$-methylvaleronitrile), dimethyl or diethyl azobismethylvalerate, and the like. These catalysts are also useful in preparing copolymers.

Further details of the preparation of compounds of this invention are given in the following illustrative examples, in which parts are by weight:

Example 1

A solution is prepared of 575 parts of 2-aminoisobutyl vinyl ether in 880 parts of dry benzene. To this solution, while it is stirred and cooled, there is slowly added over a two hour period 271 parts of ethyl chlorocarbonate. The temperature during this time is held between 0° and 10° C. The reaction is stirred for another 1.5 hours and filtered to remove amine hydrochloride. This salt is rinsed with benzene and dried in vacuo. The benzene filtrate is washed with cold, saturated sodium bicarbonate solution, dried over magnesium sulfate, and filtered. Benzene is taken off under reduced pressure to yield an oil, which is distilled to give 367 parts of ethyl N-(vinyloxy-tert-butyl)carbamate. This product distills at 70° C./1.2 mm. or 55° C./0.4 mm. It has a refractive index, $n_D^{25}$, of 1.4475.

This compound is useful as an insecticidal agent, being a stomach poison and also having contact action. It was compounded into a 5% dust which was applied to bean plants infested with bean beetle larvae. It gave a 100% kill after 24 hours. A spray was prepared with the above compound diluted 1:400. This was applied against aphids on bean plants. At 24 hours the kill was 74%. There was no foliage injury.

Example 2

To a stirred mixture of 23 parts of 2-aminoisobutyl vinyl ether, 16.6 parts of potassium carbonate, 40 parts of water, and 44 parts of benzene there is added over a 35 minute period 23.8 parts of ethyl chlorocarbonate. The heat of reaction causes the mixture to boil under reflux. Stirring is continued for 1.5 hours. Addition of 100 parts of water is made and the layers are separated. The organic layer is washed with water, dried, and stripped of volatile material by heating under reduced pressure to about 100° C. at 20 mm. The resulting oil is then distilled. At 107° to 107.5° C./13 mm. a product is obtained in an amount of 35 parts, which corresponds in composition to ethyl N-(vinyloxy-tert-butyl)carbamate.

Example 3

A portion of 10 parts of ethyl N-(vinyloxy-tert-butyl) carbamate is mixed with 0.2 part of dimethyl azodiisobutyrate and placed in a pressure container. Air is displaced therefrom with nitrogen. The container is sealed and heated at 75° C. for 48 hours. A viscous product results. It is taken up in methanol and transferred to another container, in which solvent and residual monomer are removed by heating under reduced pressure. There results a very viscous resin. This is useful for modifying the properties of alkyd coating resins. It is also useful in formulating adhesives, particularly where glass is involved, as the compound has a high degree of adhesion to glass.

Example 4

There are mixed with stirring 115 parts of 2-aminoisobutyl vinyl ether, 170 parts of benzene, 42 parts of potassium carbonate, and 200 parts of water. Thereto is slowly added diethylene glycol bischlorocarbonate in an amount of 116 parts. The heat of reaction is allowed to warm up the mixture and the reaction mixture is stirred for an hour. Layers are permitted to form and are separated. The organic layer is washed with water, dried, and heated under reduced pressure to leave an oil, which corresponds very closely in composition to that required for diethylene glycol bis(-N-(vinyloxy-tert-butyl) carbamate),

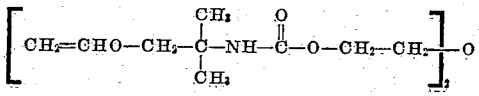

In the same way there may be used ethylene bischlorocarbonate, propylene bischlorocarbonate, thiodiethylene bischlorocarbonate, and the like to form bis(vinyloxyalkylcarbamates). These compounds polymerize to form gels.

Example 5

A mixture is prepared from 101 parts of 2-N-methylaminoethyl vinyl ether, 300 parts of toluene, 100 parts of water, and 83 parts of anhydrous potassium carbonate. This is cooled to —10° to 0° C. and 94.5 parts of methyl chlorocarbonate is carefully added over an hour, while the temperature is maintained between —10° and 0° C. The mixture is filtered and the salt cake is washed with toluene. The organic layer is washed with cold brine, dried over magnesium sulfate, and stripped of volatile material under reduced pressure. This product is purified by distilling under reduced pressure. The fraction coming over at 108° C./30 mm., 118 parts, corresponds in composition to

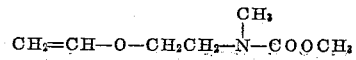

This fraction contains by analysis 8.8% of nitrogen (theory 8.8%). It has an index of refraction at 22° C.

of 1.4478. It is a water-white, pleasant smelling liquid, which is insoluble in cold water, but which hydrolyzes particularly in hot water to a water-soluble product. This hydrolysis affects only the ester group and is not noted with higher alkyl carbamates.

A portion of 10 parts of this product is mixed with 0.2 part of dimethyl azodiisobutyrate. The mixture is heated under nitrogen at 75° C. for eight hours. The resulting product, amounting to 9.8 parts, is a light yellow viscous gum. Monomer is removed by heating in vacuo. The resulting polymer is soluble in methanol and in aqueous methanol. It has a molecular weight of about 50,000, as indicated by osmotic pressure measurements. This indicates about 300 units in the polymer chain and demonstrates how the monomers of this invention can form high polymers. This is in contrast with such previously known carbamates as allyl, which exhibit low degree of polymerization.

This polymer of methyl N-methyl-N-(2-vinyloxyethyl)-carbamate has been found very desirable in sizes for fibers and fabrics of such synthetic polymers as nylon. For example, an aqueous 3.5% solution of this polymer provides an excellent warp size for pylon, this polymer having adhesion to this material and remaining water-soluble thereon.

Example 6

The procedure of Example 5 is applied to the reaction of 2-N-methylaminoethyl vinyl ether and allyl chlorocarbonate, 120.5 parts being used in place of the above methyl ester. The fraction distilling at 101° to 103° C./1.5 mm. is allyl N-vinyloxyethyl-N-methylcarbamate. It has a refractive index of 1.4640 at 25° C. and contains 58.3% of carbon, 8.1% of hydrogen and 7.6% of nitrogen. Corresponding theoretical values are 58.4%, 8.12%, and 7.57%, respectively.

A portion of 10 parts of this allyl ester is mixed with 10 parts of dimethylformamide. There is added 0.6 part of dimethyl azodiisobutyrate and the mixture is heated under nitrogen at 70° to 75° C. for six hours. A solution of polymer results. This polymer when heated at 150° C. yields an insoluble, cross-linked product.

Monomers containing the allyl group can be polymerized to soluble polymers when a high concentration of catalyst is used or the polymerization is effected in the presence of chain transfer agents such as mercaptans. The soluble polymers become cross-linked when heated at 120° to 180° C. or when air-dried in the presence of a cobalt compound.

Example 7

The procedure of Example 6 is followed with substitution of 115 parts of N-vinyloxyethyl-N-ethylamine and 108.5 parts of ethyl chlorocarbonate. There results a carbamate, ethyl N - vinyloxyethyl-N-ethylcarbamate, which distills at 75° to 80° C./2.5 mm. This product has a molecular weight of 187 and contains 7.5% of nitrogen. It has a refractive index of 1.4432 at 20.5° C.

When treated with 0.5% to 2% of an azo catalyst, it forms a polymer which is soluble in alcohols and which has a high molecular weight.

Example 8

The procedure of Example 6 is applied to 101.5 parts of N-vinyloxyethyl-N-methylamine and 168.5 parts of benzyl chlorocarbonate. The resulting product distills at 125°–127° C./0.5 mm. and corresponds in composition to benzyl N-vinyloxyethyl-N-methylcarbamate. It has a molecular weight of about 235 and contains 6.0% of nitrogen (theory 5.96%). It has a refractive index of 1.5253 at 25° C.

This compound forms polymer in low yields, but enters into copolymers readily.

Example 9

The procedure of Example 6 is applied to 164 parts of vinyl N-cyclohexylaminoethyl ether and 94.5 parts of methyl chlorocarbonate. The product is methyl N-vinyloxyethyl-N-cyclohexylcarbamate, distilling at 90°–93° C./0.3 mm. It has a refractive index of 1.4781 at 22.2° C.

This compound when treated with 0.5% to 2% of dimethyl azodiisobutyrate at 75° C. forms a polymer which is soluble in methanol, ethanol, acetone, or toluene, but is insoluble in petroleum ether, although the monomer is soluble therein. Petroleum ether may, therefore, be used to extract monomer from the polymer. The solutions of polymer deposit hard, glossy coatings and can serve as lacquers or enamels.

Example 10

The procedure of Example 6 is applied to the reaction of 108.5 parts of ethyl chlorocarbonate and 199 parts of vinyl N-(2-ethylhexyl)aminoethyl ether. The product is, however, obtained as a stripped residue. It has a molecular weight of about 270. It is soluble in hydrocarbon solvents and has plasticizing action. It corresponds in composition fairly closely to ethyl N-vinyloxyethyl-N-(2-ethylhexyl)carbamate.

Example 11

In the same way there are reacted 191 parts of vinyl N-α-methylbenzylaminoethyl ether and 94.5 parts of methyl chlorocarbonate. The product is methyl N-vinyloxyethyl-N-α-methylbenzylcarbamate. A portion of residue is distilled at about 113° C./0.5 mm. The distillate has a refractive index of 1.5140 at 20° C. It has a molecular weight of 252 (theory 249) and contains 5.6% of nitrogen (theory 5.63%). It is soluble in acetone and toluene.

By similar procedures there may be prepared cyclohexyl N-methyl-N-vinyloxyethylcarbamate, methallyl N-ethyl-N-vinyloxyethylcarbamate, butyl N-butyl-N-vinyloxyethylcarbamate, dodecyl N-methyl-N-vinyloxyethylcarbamate, octadecyl N-methyl-N-vinyloxyethylcarbamate, and so on. These long chained carbamates are of particular interest in forming copolymers which are internally plasticized.

Example 12

There are reacted by the above procedure vinyl 5-aminopentyl ether and ethyl chlorocarbonate in equimolar amounts. The product is distilled at 111° to 114° C./1 mm. in a 65% yield. It has a refractive index of 1.4579 at 17° C. and a molecular weight of 200. It corresponds in composition to ethyl 5-N-vinyloxypentylcarbamate.

This compound polymerizes under the influence of azo catalysts. The polymers are soluble in toluene and alcohols.

Example 13

There are mixed 66 parts of dodecyl N-methyl-N-vinyloxyethylcarbamate and 33 parts of octadecyl N-methyl-N-vinyloxyethylcarbamate. The mixture is treated with one part of dimethyl azodiisobutyrate and heated under nitrogen at 75° C. for 16 hours. A viscous polymer forms. It is soluble in hydrocarbon solvents and petroleum oils. In a wax-containing Pennsylvania motor oil it depresses the pour point at concentrations from 1% to 5%.

Copolymers are readily formed from a vinyloxyalkylcarbamate of this invention and another vinylidene compound which is polymerizable with free radical catalysts. While polymerizable monovinylidene compounds are preferred, there may also be used polyvinylidene compounds. These, of course, promote cross-linking with its attendant effects. Useful free radical-polymerizable vinylidene comonomers include acrylates, methacrylates, acrylonitrile, methacrylonitrile, acrylamides, methacrylamides, styrene, vinyl esters, etc.

Example 14

A mixture of 50 parts of methyl N-methyl-N-vinyloxyethylcarbamate, 50 parts of 2-ureidoethyl vinyl ether, and 2 parts of azodiisobutyronitrile is heated under nitrogen at 60° C. for 10 hours. A polymer forms. It is precipitated with acetone, separated, and dried to give a water-soluble, white solid. This polymer is useful in the finishing of textiles and for imparting wet strength to paper.

In place of the above vinyl ether there may be used vinyl β-hydroxyethyl ether, 3-ureidopropyl vinyl ether, or the like. Carbamates with larger N-substituents or larger alcohol residues may be used, although a smaller proportion of such carbamate will be copolymerized if water-solubility is to be maintained.

Example 15

A mixture is prepared from 20 parts of methyl N-cyclohexyl-N-vinyloxyethylcarbamate, 30 parts of methyl methacrylate, 70 parts of xylene, and 0.5 parts of benzoyl peroxide. This mixture is slowly added to a reaction vessel which contains a stirrer, which has been flushed with nitrogen, and which has been heated to about 100° C. In about an hour a clear solution having a viscosity of Z on the Gardner-Holdt scale at 40% solids is obtained. Films are formed from this solution. They are dried and baked at 150° C. for 15 minutes. The baked films are clear, hard, and yet flexible. They possess excellent adhesion to glass and metal.

A portion of the above solution is treated with 3% of diethylenetriamine. Films are formed from this modified solution and are baked at 150° C. for an hour. The films retain excellent adhesion and have considerable resistance to solvents.

In place of the above methyl methacrylate there is used ethyl methacrylate, or butyl methacrylate. The resulting films are tough and still adhesive. There is used a mixture of methyl methacrylate and ethyl acrylate. The resulting interpolymer is tough and flexible. Substitution of butyl acrylate for all of the above methyl methacrylate yields copolymers giving tacky films. These are useful as laminating adhesives.

Example 16

There are mixed with stirring 80 parts of acrylonitrile, 20 parts of methyl vinyloxypentylcarbamate, 290 parts of water, and 10 parts of a surface active octylphenoxypolyethoxyethanol having about 20 oxyethylene units. This mixture is treated with one part of ammonium persulfate and 1.2 parts of diethylenetriamine. The mixture is heated to 40° C., where an exothermic reaction begins and carried the temperature to 67° C. The mixture is stirred for four hours with the temperature at 60°–65° C. There is thus formed a dispersion of a copolymer. Some of the dispersed polymer is coagulated. It has a softening point above 200° C. and is more readily soluble than unmodified polyacrylonitrile.

The same method may be applied to copolymerizing butyl acrylate and a carbamate of this invention, such as ethyl N-2-vinyloxyisobutylcarbamate. The soft copolymer which results is useful for finishing textiles. It is particularly useful on wool, to which it imparts dimensional stability without loss of hand.

Similarly, copolymers may be based on vinyl acetate, vinyl butyrate, or vinyl laurate to give products useful as tackifiers and coatings.

The above examples show the use of peroxides as free radical catalysts. The peroxides both organic, such as acetyl, caproyl, lauroyl, or benzoyl peroxides, or butyl perbenzoate, or tert-butyl hydroperoxide, or ammonium, potassium, or sodium persulfate, are particularly useful when the major proportion of monomers is based on acrylates, methacrylates, acrylonitrile, or vinyl carboxylate.

Example 17

There are mixed 100 parts of allyl N-butyl-N-vinyloxyethylcarbamate and five parts of dimethyl azodiisobutyrate. The mixture is heated under nitrogen at 75° C. for two hours to give a viscous product. This is placed in a metal mold heated at 75° C. Heating is continued at 75° C. under 500 pounds for six hours. A hard, transparent casting results which is unaffected by organic solvents.

Example 18

There are mixed 10 parts of diethylene glycol bis(N-methyl-N-vinyloxyethylcarbamate), 90 parts of a condensate of adipic acid, maleic anhydride, and propylene glycol, and two parts of benzoyl peroxide. Fiber-glass sheets are impregnated with this mixture, pressed between metal plates, and heated at 140° C. for 15 minutes. The resulting laminate exhibits excellent impact strength and has extreme resistance to steam and to organic solvents. This and similar copolymers demonstrate the unusual effectiveness of the alkylene bis(vinyloxyalkylcarbamates) as cross-linking agents. These vinyl ethers are more effective, more efficient, and more rapidly effective than, for example, allyl compounds, which are poorly incorporated in many copolymers and many actually decrease the conversion to interpolymers. The vinyloxyalkylcarbamates can be efficiently used in low proportions, at relatively low temperatures, and in relatively short times to give uniform interpolymers.

Example 19

A glass reaction vessel equipped with stirrer is charged with 76 grams (0.5 mole) of 2-aminophenyl vinyl sulfide, 500 ml. of ether, 83 grams (0.5 mole) of potassium carbonate and 100 ml. of water. The vessel and contents are cooled to 0° to 5° C. and 55 grams (0.5 mole) of ethyl chlorocarbonate is added dropwise over a 30-minute period. Stirring is continued for one hour at 20° to 25° C. and then 200 ml. of water are added and the ether is removed by distillation at reduced pressure. The reaction mixture consists of a yellow oil and a supernatant aqueous layer which is discarded. The oil is distilled to give 70 grams (a 62% yield) of product, ethyl N-2-(vinylthio)phenyl carbamate of the Formula VIII:

VIII $\quad CH_2=CHS \quad NHCOOC_2H_5$

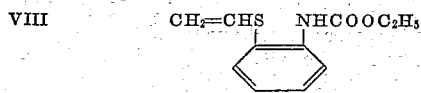

in the fraction distilling at 100° to 106° C./0.1 mm. Hg. The product has an index of refraction (20° C.) of 1.5720 and contains by analysis 6.4% N and 14.6% S; the calculated values are 6.28% N and 14.4% S.

Example 20

A solution of 6 grams of ethyl N-2-(vinylthio)phenyl carbamate and 0.12 gram of dimethyl azoisobutyrate is heated in a pressure bottle, from which air has been displaced by nitrogen, at 75° C. for sixteen hours. The polymer is isolated by precipitation with acetone and dried to give 3.42 grams of homopolymer, a conversion of 57%.

Example 21

A solution of 0.6 grams of the product of Example 19, 5.4 grams of methyl methacrylate, 1.0 grams of dimethyl azoisobutyrate and 97 grams of toluene is heated at 75° C. for sixteen hours. The polymer is isolated by stripping the toluene and precipitating the polymer with acetone. A conversion of 55% is obtained.

Example 22

A mixture of 45 grams of 2-aminoethyl vinyl sulfide, 250 ml. of benzene, 70 grams of potassium carbonate and 150 ml. of water is stirred and cooled to 10° C. A solution of 50 grams of ethyl chlorocarbonate in 100 ml. of benzene is added dropwise. The reaction temperature rises slowly and reaches 45° to 50° C. at the end of the addition. The mixture is stirred an additional 30 minutes and diluted with sufficient water (about 100 ml.)

to dissolve the salts. The benzene layer is washed with carbonate and water until the wash water is neutral. The benzene solution is concentrated and the residual oil distilled at reduced pressure to give 65 grams of colorless product, ethyl N-2-(vinylthio)ethyl carbamate, in the fraction boiling at 89° to 92° C./0.5 mm. Hg. The product has a sulfury-ester odor and contains by analysis 48.05% C; 7.35% H; 7.93% N; and 18.17% S; the calculated values are 48.0% C; 7.43% H; 8.0% N; and 18.3% S. The infra-red spectrum contains a peak at 1590 cm.$^{-1}$, characteristic of vinyl sulfide and peaks at 3330, 1530, 960 and 873 cm.$^{-1}$, characteristic of hydrogen on nitrogen thus clearly establishing the presence of the vinyl group.

*Example 23*

A casting in the form of a sheet is prepared by the polymerization of 99.5 parts of methyl methacrylate with 0.5 part of the product of Example 22 in the presence of 0.02 part of benzoyl peroxide. The resultant polymer sheet is clear and colorless. When subjected to a temperature of 200° C. for several hours, it shows a greatly decreased rate of weight-loss as compared to a homopolymer of methyl methacrylate, the sulfide group exerting a definite thermal-stabilizing action.

One of the important uses of the compounds of this invention is as chemical intermediates to form isocyanates. When the ester group is small, an alcohol is distilled from the isocyanate. When this group is large or when the ester group is bifunctional, the isocyanate can be distilled from the reaction mixture containing an alkaline catalyst. The ester formed with the diethylene glycol group in Example 4 and the equivalent compounds there discussed are suitable for yielding isocyanates in this way. Bis-carbamate and basic catalyst, such as sodium methoxide, sodium oxide, or sodium hydroxide, are heated at 150° C. to 200° C. and the resulting isocyanate is distilled off, under reduced pressure, if so desired.

Insecticidal tests with methyl N-(vinyloxyethyl)-N-methylcarbamate have shown insecticidal action for this compound. A so-called emulsion concentrate was prepared with this compound, aromatic solvent, and a non-ionic, oil-soluble wetting agent. The concentrate was diluted with water to give a 1:400 dilution of this compound. The spray was applied to bean plants infested with aphids. A 50% kill was obtained in 24 hours.

Another valuable action of the carbamates of the present invention which have groups of sufficient size to ensure solubility in organic solvents is in the field of plasticizers. For example, when ethyl N-vinyloxyethyl-N-2-ethylhexylcarbamate is milled into such vinyl polymers as those based on vinyl chloride, including vinyl chloride-vinyl acetate copolymers, at 2% to 40% either as a primary plasticizer or better in combination with other plasticizers, it exerts a definite softening effect, promoting flexibility at reduced temperatures.

The vinyloxyalkylcarbamates are of especial interest because of the modifying influence of the carbamate group on the vinyl ether radical. Even though the carbamate and vinyl groups are separated by an alkylene chain of as much as eight carbon atoms between the ether oxygen and carbamate nitrogen, the influence of the carbamate group remains a controlling factor. This is best illustrated by the fact that vinyloxyalkylcarbamates are polymerized with free radical catalysts. The presence of 1% to 2% of an azo free-radical catalyst, such as dimethyl azodiisobutyrate, gives over 90% conversion to polymer in 16 hours. In contrast vinyl butyl ether, as a typical vinyl alkyl ether, is scarcely affected by free radical catalysts. Even with amounts up to 10% of azodiisobutyronitrile or dimethyl azodiisobutyrate less than 1% conversion to polymer was obtained in 16 hours. The vinyl alkyl ethers require acidic catalysts for polymerization, whereas acids are actually objectionable with the vinyloxyalkylcarbamates and catalytic amounts of Friedel-Crafts catalysts are ineffective.

It is to be understood that changes and variations may be made without departing from the spirit and scope of the invention as defined in the appended claims.

We claim:

1. As a composition of matter, an ester selected from the group consisting of those having the structure of Formulas I and II:

I 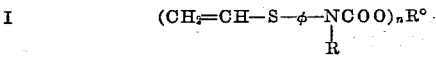

II 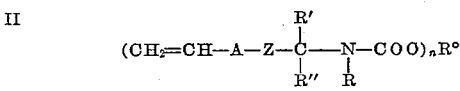

wherein $\phi$ is selected from the group consisting of o-phenylene and p-phenylene, A is selected from the group consisting of oxygen and sulfur, Z is an alkylene group of one to seven carbon atoms, $n$ is an integer having a value of 1 to 2, R is a member of the class consisting of hydrogen, alkyl, alkenyl, benzyl, and cyclohexyl groups, R° is selected from the class consisting of (a) alkyl, alkenyl, benzyl, and cyclohexyl groups when $n$ is 1, and (b) divalent glycol residues when $n$ is 2, and R' and R" each represent a member selected individually from the class consisting of hydrogen and alkyl groups of one to four carbon atoms, R' and R" not being hydrogen when all of three conditions exist simultaneously, namely that (1) R is hydrogen, (2) A is oxygen, and (3) Z is an alkylene chain of only one to two carbon atoms.

2. A polymer of a compound of claim 1.

3. A copolymer of a compound of claim 1 with another free radical-polymerizable vinylidene compound.

4. A copolymer according to claim 3 in which the vinylidene compound is a monovinylidene compound.

5. A compound of the structure

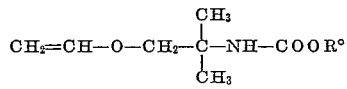

wherein R° is an alkyl group of 1 to 24 carbon atoms.

6. A polymer of a compound of claim 5.

7. A compound of the structure

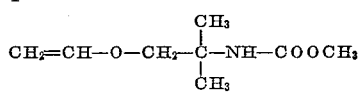

8. A compound of the formula

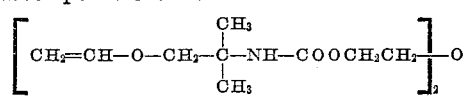

9. A compound of the formula

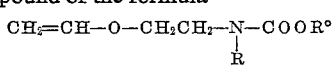

wherein R and R° are alkyl groups of 1 to 18 carbon atoms.

10. A polymer of a compound of claim 9.

11. As a composition of matter, an ester having the structure of the formula

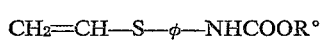

where $\phi$ is selected from the group consisting of σ-phenylene and p-phenylene, and R° is an alkyl group having 1 to 4 carbon atoms.

12. A polymer of an ester as defined in claim 11.

13. As a composition of matter, an ester having the structure of the formula

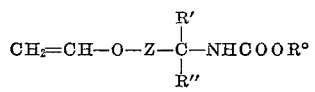

where Z is an alkylene group of one to seven carbon atoms, R' is an alkyl group of 1 to 4 carbon atoms, R"

is an alkyl group of 1 to 4 carbon atoms, and R° is an alkyl group of 1 to 24 carbon atoms.

14. A polymer of an ester as defined in claim 13.

15. A copolymer of an ester as defined in claim 13 with an ester of acrylic acid.

16. A copolymer of an ester as defined in claim 5 with butyl acrylate.

17. As a composition of matter, ethyl N-2-(vinylthio)-phenyl carbamate.

18. A copolymer of an ester as defined in claim 17 with methyl methacrylate.

19. As a composition of matter, ethyl N-2-(vinylthio)-ethyl carbamate.

20. A copolymer of an ester as defined in claim 19 with methyl methacrylate.

References Cited in the file of this patent

UNITED STATES PATENTS 2,598,664 Kropa ----------------- June 3, 1952